Patented Apr. 13, 1926.

1,580,424

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

MAGNESIUM-CONTAINING SYNTHETIC RESIN AND PROCESS OF MAKING SAME.

No Drawing.    Application filed June 11, 1923. Serial No. 644,801.

*To all whom it may concern:*

Be it known that I, CARLETON ELLIS, a citizen of the United States, and a resident of Montclair, in the county of Essex and State of New Jersey, have invented certain new and useful Improvements in Magnesium-Containing Synthetic Resins and Processes of Making Same, of which the following is a specification.

This invention relates to a synthetic resin of a metallo-organic character containing or derived from magnesium phenate or preferably magnesium polyphenate and to the process of making same and also to compositions containing such synthetic resins including compositions intended for use in the plastic industries.

The present invention is concerned particularly with the reaction products of formaldehyde and magnesium phenate or polyphenate yielding magnesium-containing resins having novel properties.

Heretofore various processes have been proposed involving reactions between phenols and formaldehyde in the presence of a small amount of catalytic substance, usually an acid or an alkali. Ammonia is used extensively as a catalyst. Large proportions of alkaline substances have however been looked upon as detrimental, yielding products of no technical value.

The present invention in contradistinction to such prior processes is based upon the employment of a phenate containing a high proportion of an alkaline earth base namely magnesium oxide, hydroxide and the like. The amount of magnesium in the form of such base may be sufficient to combine completely with the phenol, cresol or other phenolic body employed to form normal phenates or the proportion of the magnesium base may be modified to yield polyphenates as for example the tetraphenate of magnesium.

A synthetic resin made in accordance with the present invention may be prepared in various ways; that is the methods of mixing, temperature, solvents, etc., may be variously modified; certain of these procedures forming the basis of copending applications.

The following procedure will serve in an illustrative manner to indicate a very simple way of securing a resinous compound in accordance with one form of the present invention.

94 parts by weight of phenol and 6 to 8 parts of magnesium hydroxide or approximately one-fourth the normal chemical equivalent of phenol are mixed and heated with 94 parts by weight of aqueous formaldehyde of approximately 40 per cent strength. The temperature is maintained at 90-95° C. and the reaction mixture is stirred. The magnesium hydroxide, which is insoluble in water and in aqueous formaldehyde of the above strength, begins to dissolve and eventually a dark red homogeneous solution is obtained. The heating and stirring is continued for about three hours. This solution contains the magnesium phenate resin. On evaporation on the hot plate of a small test sample of this solution it will be found that a tough water-insoluble resin of great strength is obtained. Prepared in this manner the aqueous solution if reacted beyond a certain point will not permit of any further dilution with water without separation, an emulsion being formed on the addition of water. The yield of resin according to the foregoing is approximately 120 per cent of the weight of the phenol taken. It will be observed that by employing magnesium hydroxide to the extent of about one-fourth of the normal molecular equivalent or chemical equivalent of phenol the proportions are such as to permit of the formation of magnesium tetraphenate. This compound apparently forms more readily in the presence of formaldehyde and yields the magnesium-containing synthetic resin of the present invention. Formaldehyde may act as a catalyst in bringing about the formation of compounds of magnesium and the phenolic material.

The resin hardens on exposure to heat rapidly becoming less soluble and less fusible. It may therefore be fashioned to any desired shape by exposing to pressure in a heated mold. Heat resistant products thus are obtained. The addition of the various fillers customarily employed in the plastic industry is feasible and for this purpose such mineral powders as marble dust, barytes, chalk and the like may be employed. The magnesium phenate resin appears to act somewhat differently with silicate fillers such as asbestos, talc and the like, there probably being some reaction between the magnesium phenate and silicate fillers which does not occur with a basic filler such as chalk or zinc oxide. In making compositions of this character with mineral fillers it has long been customary to add a small percentage of cotton flock to increase resistance to shock. The latter tends to mat together forming lumps which are difficult to distribute through the mass of a molding composition as for example ordinary hot molded shellac products. In the aqueous solution of magnesium polyphenate resin cotton flock will be found to disseminate readily and hence may be incorporated with mineral fillers without the troubles attendant upon mixing it in other ways.

Various pigments may be employed such as chrome green, iron oxide, lamp black and the like or a dyestuff such as nigrosine.

The magnesium tetraphenate resin solution also may be mixed with the customary organic fillers such as wood flour or wood pulp and with substances such as casein, starch, gelatine and various other modifying agents.

For example a sufficient amount of the foregoing solution is added to wood flour to make equal parts by weight of the magnesium tetraphenate and the filler. This is well mixed and dried for a half hour in vacuo employing a vacuum of 28 inches as indicated by an ordinary vacuum gauge. Drying in vacuo is a desirable step to keep the temperature as low as possible during drying and prevent reaction taking place to an undue amount. When placed in a mold in a hydraulic press heated to a temperature of 170° C. a hard strong product is obtained which may be removed from the mold without cooling.

A magnesium diphenate resin is obtained by mixing together phenol and an amount of magnesium hydroxide equal to one-half the normal molecular equivalent of the phenol. Formaldehyde (40% aqueous) in about equal proportions by weight is added. In this case it is probable that a mixture of magnesium diphenate and tetraphenate are obtained as the tendency of the phenol, based on its behavior with certain other substances, probably is to form a certain amount of tetraphenate in spite of the large excess of magnesium hydroxide present. On heating to 90-95° C. for 1½ hours, with stirring, under a reflux condenser, a satisfactory solution is obtained. By pouring a small sample of the liquid on the hot plate a tough resin is obtained. The phenate resin solution obtained according to the foregoing may be diluted with water without separation. The reaction between the phenate and formaldehyde may be carried out in open or closed vessels at atmospheric or higher pressures.

Aqueous solutions prepared in this manner serve cheaply and conveniently to mix with filling materials in making plastic molding compositions. Other solvents however may be used in some cases.

In a resinous composition employed for molding purposes the magnesium phenate or tetraphenate has advantage over other bases in that any magnesium hydroxide or oxide present, accidentally or by design, is not soluble in water as would be the case with sodium or potassium hydroxides. The hydroxides of calcium and barium also are soluble. Exposed to air magnesium hydroxide slowly forms the carbonate which likewise is insoluble. This also is true of calcium and barium hydroxides but of course in the case of sodium or potassium hydroxide the carbonates are soluble and more or less hygroscopic. In other words magnesium phenate although a resin of a metallo-organic type does not contain the metallic element in a form which is deleterious when the resinous material is employed for many purposes.

Despite the foregoing statements I do not wish to be limited solely to the use of magnesium material but may employ along with the basic magnesium compound some other base such as calcium oxide or hydroxide. Thus dolomitic quick lime would furnish both magnesium and calcium oxide in a cheaply available form. Also I may employ other bases in conjunction with magnesium, or calcium and magnesium including caustic soda and ammonia. However it may be noted that the former is usually objectionable except in traces because of its moisture absorbing properties. Likewise ammonia not being a fixed alkali is open to the objection that blistering may result in carrying out molding at high temperatures.

The procedures given above may be varied with respect to the nature of the ingredients, the mode of mixing or incorporation, the proportions employed and also the temperature and pressure. Thus in place of formaldehyde, paraform may be employed and an anhydrous product instead of an aqueous solution obtained. For example freshly prepared magnesium hydroxide free from carbonate and soluble salts may be mixed while wet with phenol, boiled to expel water and further heated to yield a pasty product. This is admixed with paraform and on further heating a brown resinous substance is obtained. Also instead of using formaldehyde as the sole aldehyde additions of acetaldehyde, butyl aldehyde etc. may be made or the formaldehyde replaced entirely in some cases by other aldehydes.

Another procedure is as follows: Phenol is heated to the boiling point, a crystal of iodine added and the requisite quantity of magnesium powder introduced. Reaction takes place to form the phenate or polyphenate as the case may be. On cooling a brown solid is obtained. When mixed with for example paraform and heated an infusible resin results. Hexamethylenetetramine may be used in place of paraform in case reaction is desired under anhydrous conditions.

The solution of formaldehyde employed in accordance with certain of the above illustrative procedures may be stronger or weaker than the usual commercial 37–40 per cent strength. The formaldehyde solution may be added all at once to the other ingredients or it may be run gradually into the mixing chamber in the presence of the other ingredients. If the heat of reaction is excessive cooling may be employed or the formaldehyde may be diluted with water.

What I claim is:—

1. The process which comprises heating magnesium phenate with aqueous formaldehyde to form an aqueous solution of resin.

2. The process of making resinous material which comprises reacting on magnesium tetraphenate with an aldehyde.

3. The process of making resinous material which comprises reacting on magnesium tetraphenate with formaldehyde.

4. The resinous reaction product of formaldehyde and a phenate of magnesium.

5. The resinous reaction product of an aldehyde and a phenate of magnesium.

6. The resinous reaction product of formaldehyde and magnesium tetraphenate.

7. The resinous reaction product of formaldehyde and magnesium polyphenate.

8. A heat-hardened resinous reaction product of formaldehyde and magnesium tetraphenate.

9. A heat-hardened resinous reaction product of formaldehyde and magnesium polyphenate.

10. A heat-hardened resinous reaction product of formaldehyde and a phenate of magnesium.

11. A heat-hardened shaped article comprising the resinous reaction product of formaldehyde and magnesium polyphenate.

12. A heat-resistant molded article comprising filling material and a binder therefor comprising the reaction products of formaldehyde and magnesium polyphenate.

13. An aqueous solution comprising resinous reaction products of formaldehyde and a phenate of magnesium.

14. The resinous reaction product of formaldehyde, phenol, and a magnesium oxide.

15. The resinous reaction product of formaldehyde, phenol and hydrated magnesium oxide.

16. The resinous reaction product of formaldehyde, phenol, and magnesium oxide, the amount of magnesium oxide being approximately not greater than one-half the normal molecular equivalent of the phenol.

17. The resinous reaction product of formaldehyde, phenol, and magnesium oxide, the amount of magnesium oxide being approximately equal to one-fourth the normal molecular equivalent of the phenol.

18. The process of producing resinous products which comprises reacting together formaldehyde, phenol, and a magnesium oxide.

19. The process of producing resinous products which comprises reacting together formaldehyde, phenol, and hydrated magnesium oxide.

20. The process of producing resinous products which comprises reacting together formaldehyde, phenol, and magnesium oxide, the amount of magnesium oxide being approximately not greater than one-half the normal molecular equivalent of the phenol.

21. The process of producing resinous products which comprises reacting together formaldehyde, phenol, and magnesium oxide, the magnesium oxide being approximately equal to one-fourth the normal molecular equivalent of the phenol.

22. A heat-hardened resinous reaction product of formaldehyde, phenol, and magnesium oxide, the magnesium oxide being approximately not greater than one-half the normal molecular equivalent of the phenol.

23. A heat-hardened resinous reaction product of formaldehyde, phenol, and magnesium oxide, the magnesium oxide being approximately equal to one-fourth the normal molecular equivalent of the phenol.

CARLETON ELLIS.